United States Patent
Warren (10) Patent No.: US 9,581,812 B2
(45) Date of Patent: Feb. 28, 2017

(54) ARCHITECTURES AND TECHNIQUES FOR OPTICAL ABERRATION CORRECTION

(71) Applicant: THE AEROSPACE CORPORATION, El Segundo, CA (US)

(72) Inventor: David W. Warren, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 100 days.

(21) Appl. No.: 14/477,242

(22) Filed: Sep. 4, 2014

(65) Prior Publication Data

US 2016/0070090 A1    Mar. 10, 2016

(51) Int. Cl.
    *G02B 13/18*    (2006.01)
    *G02B 3/02*    (2006.01)
    *G02B 27/00*    (2006.01)

(52) U.S. Cl.
    CPC .................. *G02B 27/0025* (2013.01)

(58) Field of Classification Search
    CPC .............. H01J 37/153; H01J 2237/1534; H01J 2237/2802; H01J 2237/216; H01J 2237/221; H01J 37/21; H01J 2237/21; H01J 2237/0453; H01J 2237/0458; H01J 2237/0455; H01J 2237/1536; H01J 2237/2803; A61B 3/1015; A61B 3/103; A61F 9/00808; A61F 2009/00844; A61F 2009/0088; A61F 9/00806; A61F 2009/00848; A61F 2002/1699; A61F 2/1654; A61F 2/1613; A61F 9/00804; G02B 13/18; G02B 2027/011; G02B 2027/0123; G02B 2027/0147; G02B 27/0025; G02B 27/0101; G02B 27/4216; G02B 3/04; G02B 17/0888; G02B 27/09; G02B 27/4211; G02B 27/002; B81B 2203/058; B81B 3/0062

See application file for complete search history.

(56) References Cited

U.S. PATENT DOCUMENTS

| 4,666,256 A | 5/1987 | Shimizu et al. |
| 9,244,274 B2 * | 1/2016 | Ma .................... G02B 27/0025 |
| 2014/0085532 A1 * | 3/2014 | Caldwell ............ G02B 27/0025 348/360 |

OTHER PUBLICATIONS

Herbert Gross et al., Handbook of Optical Systems, Survey of Optical Instruments, 2008, pp. 595-599, vol. 4, Wiley-VCH, Weinheim, Germany.

* cited by examiner

*Primary Examiner* — Alicia M Harrington
(74) *Attorney, Agent, or Firm* — Sutherland Asbill & Brennan LLP (57) ABSTRACT

Aspects of the disclosure relate to correction of aberration in optical systems. In one aspect, correction of aberration can rely on a corrector lens that is movably positioned between an objective lens and an optical member, and that can introduce a perturbation to a convergent beam of light that forms an image at the substantially the focal point of the objective lens. The formed image presents aberration and such a perturbation can correct at least a portion thereof. In another aspect, the corrector lens can embody or can comprise a positive power lens, that introduces the perturbation via, at least in part, a radially symmetric wavefront correction into the convergent beam, where such a correction varies as a fourth power of a radial distance from a central axis of propagation of the convergent beam of light.

20 Claims, 8 Drawing Sheets

ARCHITECTURES AND TECHNIQUES FOR OPTICAL ABERRATION CORRECTION

BACKGROUND

An optical system may introduce aberration as a result of various factors, including, for example, non-ideal characteristics of one or more elements that are a part of the optical system, or as a result of an environment in which the optical system is used. In one example, a lens made of poor quality material may have a non-uniform refractive index in an image-forming portion of the lens, thereby leading to aberration in an image generated by propagating light through this portion of the lens. In another example, even when the material used for fabricating a lens is of acceptable or otherwise desired quality, in some cases, the fabrication process may lead to physical imperfections that create aberration in an image generated by propagating light through the lens. In addition, environmental factors can lead to aberrations. For instance, in scenario in which the optical system is embodied in a telescope, it can be understood that various atmospheric phenomena, such as changes in temperature, and/or of gaseous composition of the various strata in the atmosphere may lead to aberrations in an image obtained via the telescope.

While certain conventional technologies may address at least some of the problems described above by using imaging post-processing techniques to rectify some of the aberrations introduced into an image, such techniques may increase complexity and/or cost of correction of aberration in optical systems.

SUMMARY

The disclosure recognizes and addresses, in at least certain aspects, the presence of aberration in optical systems. As described in greater detail below, certain embodiments of the disclosure can be directed to architectures and techniques for aberration correction. In certain aspects, such architectures and/or techniques can permit a pre-emptive approach to mitigating or avoiding aberrations without reliance on imaging post-processing.

According to one example embodiment of the disclosure, an optical assembly can include an objective lens that can produce a convergent beam of light, an optical member having a predetermined thickness, and a corrector lens. The optical member, which may be positioned at a predetermined distance from the objective lens, can propagate at least a portion of the convergent beam of light, whereby propagation of the at least the portion of the convergent beam of light yields aberration of an image formed from at least the propagated portion of the convergent beam of light. The corrector lens can be movably positioned between the objective lens and the optical member based at least in part the predetermined thickness of the optical member. The corrector lens can introduce a radially symmetric wavefront correction which varies as a fourth power of a radial distance from a central axis of propagation of the convergent beam of light, whereby the corrector lens corrects at least part of the aberration.

According to another example embodiment of the disclosure, an optical assembly can include an objective lens, an optical member having a predetermined thickness, and a first corrector lens. The objective lens can produce a convergent beam of light. The optical member can be positioned at a predetermined distance from the objective lens and can propagate at least a portion of the convergent beam of light, whereby propagation of at least the portion of the convergent beam of light yields aberration of an image formed from at least the propagated portion of the convergent beam of light. The first corrector lens can be positioned between the objective lens and the optical member, wherein the first corrector lens introduces a first radially symmetric wavefront correction which varies as a fourth power of a radial distance from a central axis of propagation of the convergent beam of light prior to propagation of the at least the portion of the convergent beam of light through the optical member.

According to yet another example embodiment of the disclosure, a method includes: providing an objective lens that produces a convergent beam of light; providing an optical member having a predetermined thickness and positioned at a predetermined distance from the objective lens, the optical member propagates at least a portion of the convergent beam of light, whereby propagation of at least the portion of the convergent beam of light yields aberration of an image formed from at least the propagated portion of the convergent beam of light; and providing a corrector lens movably positioned between the objective lens and the optical member, the corrector lens introduces a first radially symmetric wavefront correction which varies as a fourth power of a radial distance from a central axis of propagation of the convergent beam of light, whereby the corrector lens corrects at least part of the aberration.

Other embodiments and aspects of the disclosure will become apparent from the following description taken in conjunction with the following drawings.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION

The disclosure now will be described more fully hereinafter with reference to the accompanying drawings, in which example embodiments of the disclosure are shown. This disclosure may, however, be embodied in many different forms and should not be construed as limited to the example embodiments set forth herein. Rather, these embodiments are provided so as to illustrate the various principles for optical management in accordance with the present disclosure. Like numbers refer to like elements throughout.

The aberration corrector architectures and techniques described herein in accordance with aspects of the disclosure can address (e.g., reduce or avoid) aberration that can be introduced by an optical element that may not necessarily be a component of a beam converging system but is located or otherwise disposed in the optical path of a converging beam of light. More particularly, yet not exclusively, in one or more of the example embodiments, the optical element can be embodied in or can comprise a window, such as, for example, a window of a vacuum or cryogenic chamber. It will be understood that the window is referred to herein solely for convenience of description, and that in various other embodiments, other optical elements may contribute towards introducing aberration. The solutions provided herein may be effectively applied in those embodiments as well.

Figure 1A:
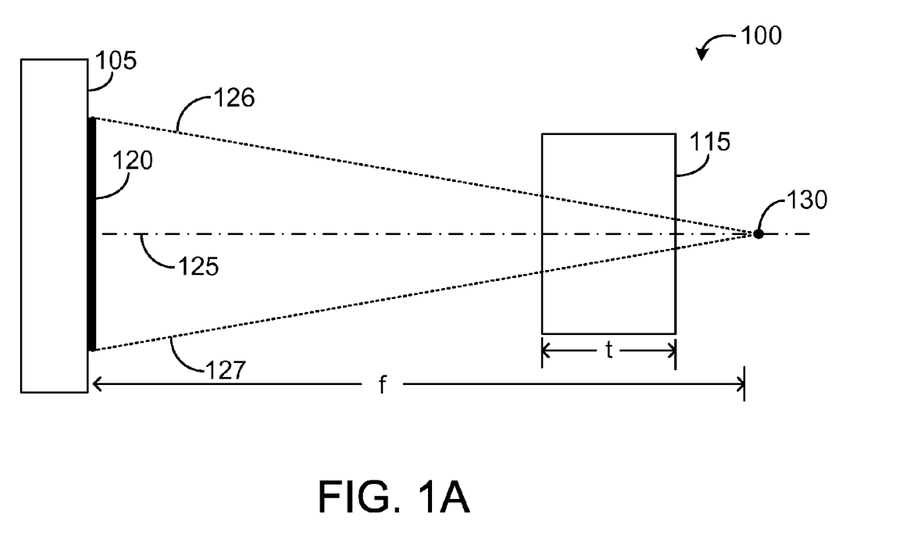
FIGS. 1A-1B illustrate uncorrected image performance in an optical system in accordance with one or more aspects of the disclosure.
Figure 1B:
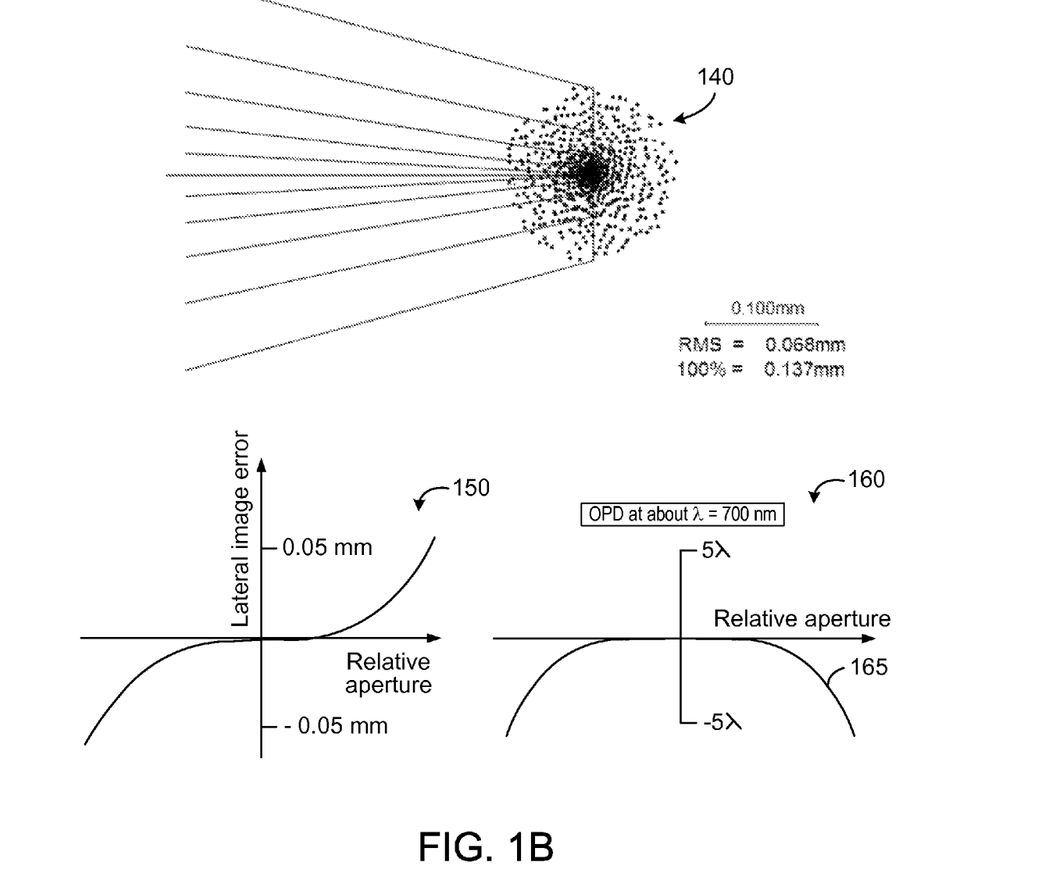

FIGS. 1A-1B illustrate uncorrected image performance in an example optical system 100 in accordance with one or more aspects of the disclosure. The example optical system 100 includes the objective lens 105 with a focal length f (e.g., 30.5 mm in air), and an optical member 115 having a thickness t. The objective lens 105 can be utilized or otherwise leveraged to produce a convergent beam of light (represented by dashed lines 126 and 127) via an aperture 120. In can be appreciated that, in one aspect, it is desired that such a convergent beam of light generates, at focal point 130, a focused image with no aberrations. In one example embodiment, the objective lens 105 can be embodied in or can comprise a 10×0.26 NA microscope objective lens, and the optical member 115 can be embodied in or can comprise a N-BK7 slab (e.g., a window) having a thickness of about 19 mm. It should be appreciated that the term N-BK7 is an industry-wide designation for Borosilicate Crown glass, which can be utilized for a wide variety of optical applications in the visible portion of the electromagnetic radiation spectrum. It should be further appreciated that, in additional or alternative embodiments, the optical member 115 can be formed from other materials, such as fused silica ($SiO_2$), sapphire ($Al_2O_3$), zinc selenide (ZnSe), or silicon (Si) appropriate for the wavelengths of the electromagnetic radiation being propagated.

Certain characteristics of the optical member 115 can be known beforehand. For example, certain light propagating characteristics, such as wavefront distortion, rays-related distortion, and/or wavelength-related distortion may be known and quantified. These known characteristics can be then used to determine the nature of the aberrations that are introduced into the image generated at the focal point 130. Some of these light propagating characteristics are described below in more detail using other figures.

Also known beforehand are various other parameters, such as the distance between the objective lens 105 and the optical member 115, a thickness t (or a range of thicknesses) of the optical member 115, a material of the optical member 115, one or more shape-related characteristics of the optical member 115, etc. As described below in further detail, the thickness of the optical member can play a significant role in various aspects in accordance with the disclosure. It should be understood that the rectangular shape of the optical member 115 having a thickness t is illustrative and other shapes also are contemplated in the present disclosure. In other example embodiments, the optical member 115 may have an irregular shape (for example, a shape having non-parallel major surfaces) with various thicknesses along one or more axis (e.g., x, y, and z dimensions) of the optical member 115.

As illustrated in the example optical system 100, the optical member 115 can be located or otherwise disposed in the path of the convergent beam of light, and can introduce an undesirable aberration in the image formed at the focal point 130, even if the objective and window are optically ideal. Such undesirable aberration can be spherical aberration that arises from the difference in the manner in which rays that propagate from different parts of the aperture refract through the optical member 115. Without intending to be bound by theory and/or modeling, in one example, the spherical aberration introduced by the optical member 115 can be represented or otherwise assessed via an image error measured in terms of ray lateral position error. For instance, FIG. 1B presents an image caustic at the paraxial focus in the example optical system 100. Without intending to be bound by theory and/or modeling, the paraxial focus may be defined as the intersection point with the optical axis 125 of rays propagating proximately to the optical axis. The image 140 includes a geometric image spot having a root mean square (RMS) diameter of about 0.068 mm, and maximum geometric image diameter of about 0.137 mm. Graph 150 presents a quantification of ray position error in terms of a lateral image error (which is conveyed in the ordinate) with respect to relative aperture (which is conveyed in the abscissa), where the relative aperture refers to radial position within the aperture 120. It can be gleaned from graph 150 that the magnitude of the lateral image error increases with the magnitude of the relative aperture.

In another example, in an alternative interpretation, image error cause by spherical aberration introduced by the optical member 115 can be characterized or assessed in terms of wavefront propagation. More particularly, the wavefront of an idealized image can be represented as the surface of a sphere centered on the image point (e.g., focal point 130). In such a representation, rays that form the idealized image can be represented as local vectors normal to the wavefront at any point on such a sphere, where the local vectors are directed or otherwise point towards the center of the sphere. In the presence of aberration, the rays that form the image may not propagate through the center of the sphere, which can be equivalent to the surface of the spherical wavefront being distorted at the location of the ray (e.g., the location of the vector normal to such surface). Graph 160 is indicative or otherwise representative of optical path difference (OPD), or wavefront error, at a wavelength ($\lambda$) of substantially 700 nm. In the graph, the relative aperture is conveyed in the abscissa and wavelengths of wavefront error are conveyed in the ordinate. Graph 160 may be referred to as a wavefront plot, and conveys the distortion of an idealized spherical wavefront as a function of radial position in the aperture (e.g., about the axis 125, assuming radial symmetry of the optical arrangement in the example optical system 100). It should be appreciated that, in one aspect, the shape of the wavefront plot depends on the axial position that is selected to be the center of the reference sphere. As illustrated in graph 160, in a scenario in which such axial position is the paraxial focus, the wavefront error (e.g., the OPD) can be a monotonic, 4th order function 165 of the relative aperture (or the radial position in the aperture).

Figure 2:
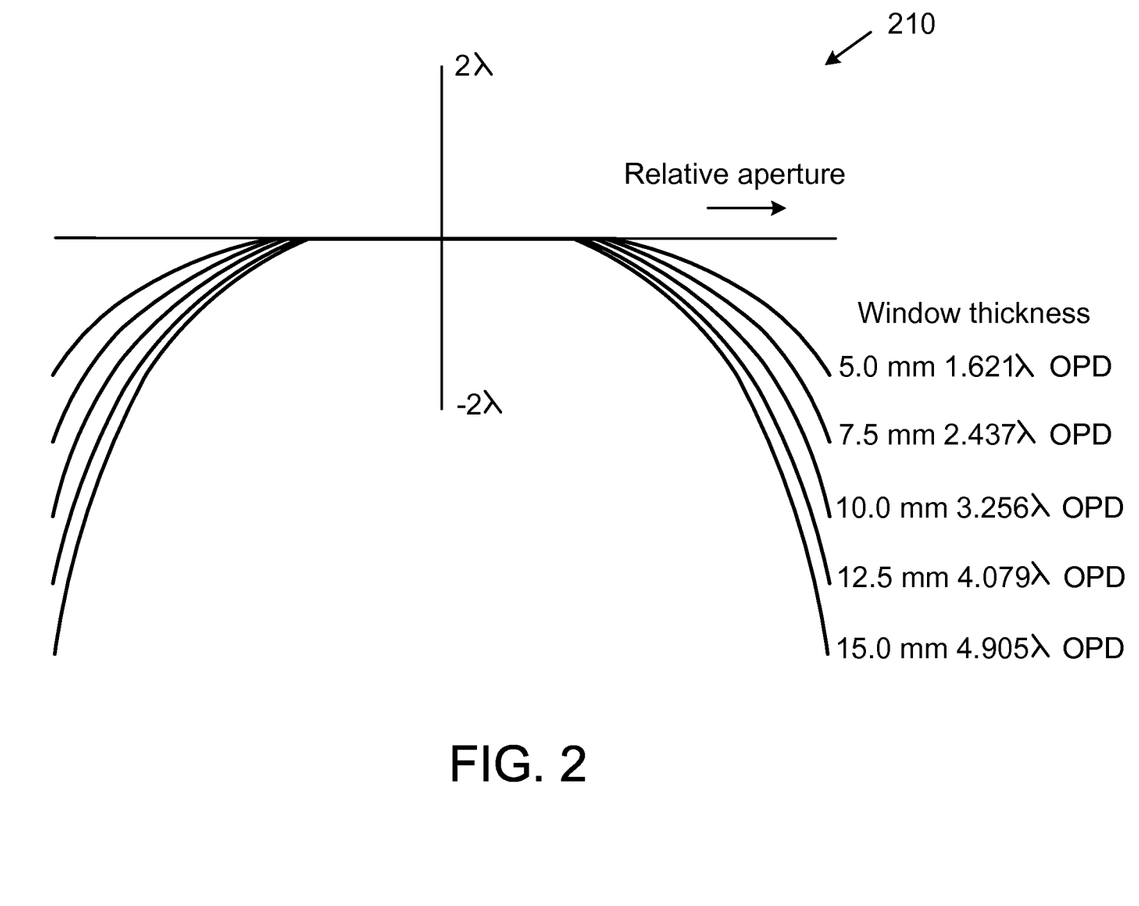
FIG. 2 presents an example graph that is associated with aberration-yielding optical members of various thicknesses in accordance with one or more aspects of the disclosure.

As illustrated in FIG. 2, the magnitude of the wavefront error at the edge of the aperture (e.g. rays 126 and 127 in FIG. 1) and relative to the paraxial focus increases linearly with the thickness of the optical member 115, while preserving a monotonic 4th order dependence on radial position on the aperture 120 substantially independently of the thickness of the optical member 115. Information in example graph 210 can be obtained for an example embodiment of optical system 100 in which the optical member 115 is formed from fused silica. As described herein, the optical member 115 can have a thickness t, and the example graph 210 is indicative of OPD at $\lambda_0=700$ nm that is associated with the aberration-yielding optical members 115 at different thicknesses. More specifically, in graph 210, the abscissa and ordinate convey, respectively, relative aperture and wavelengths of OPD, and can be utilized to indicate a set of curves corresponding to optical members having respective thicknesses (t) of about 5 mm, about 7.5 mm, about 10 mm, about 12.5 mm, and about 15 mm. The maximum OPDs at $\lambda_0=700$ nm of these optical members are, respectively, about $1.621\lambda_0$, about $2.43\lambda_0$, about $3.256\lambda_0$, about $4.079\lambda_0$, and about $4.905\lambda_0$. As described herein, the data shown in the graph 210 are obtained with an objective lens 105 embodied in a 10×NA 0.26 objective (f/1.92) having an entrance pupil diameter (EPD) (represented as the aperture 120) of about 16 mm.

Figure 3:
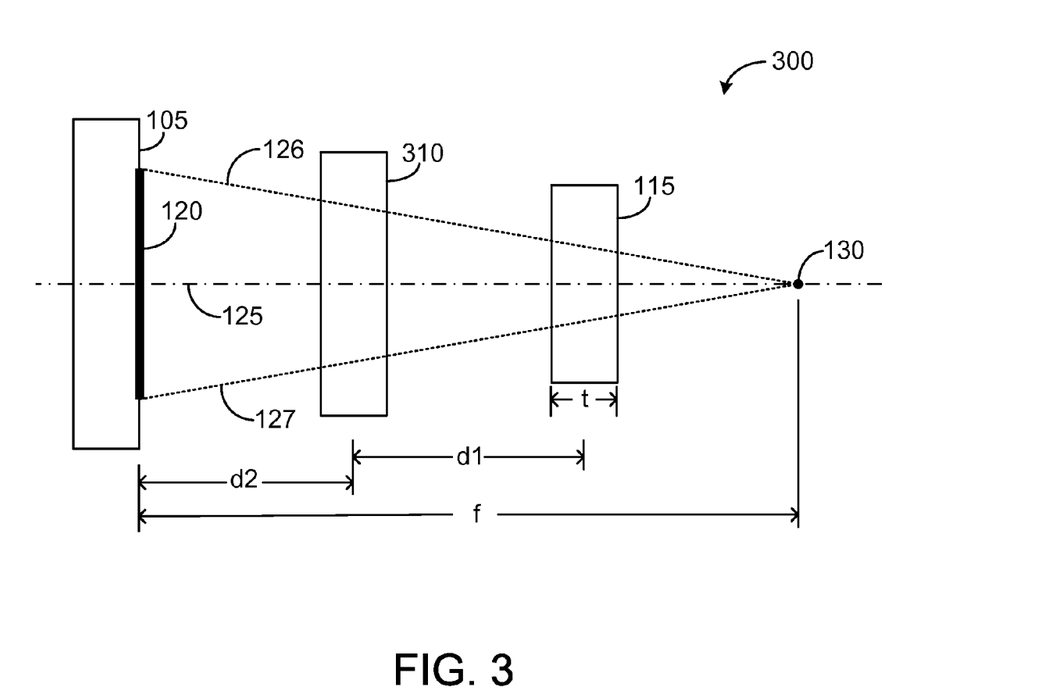
FIGS. 3-6 present example optical systems in accordance with one or more aspects of the disclosure.

In one aspect, in order to correct an aberrated wavefront associated with light propagating through the optical member 115 and forming an image at a focal point 130 (e.g., a converging focus scenario), a correction (which also may be referred to as perturbation) can be introduced prior to the wavefront propagating through the optical member 115, where the correction can distort the wavefront propagating from the aperture 120 towards the focus point 130 by amount that is substantially the same or the same in magnitude, yet opposite in phase, to the aberration introduced by the optical member 115. Accordingly, FIG. 3 presents an example optical system 300 that includes a corrector lens 310 that permits correction of aberration in accordance with one or more aspects of the disclosure.

One or more characteristics and/or parameters of the optical elements (e.g., objective(s), lens(es), member(s), combinations thereof, or the like) described herein may be used to determine the use of a corrector lens 310. The parameters associated with the corrector lens 310 may include a shape, one or more physical dimensions, a material, and/or a location for placement of the corrector lens 310 at certain distances with reference to one or both of the objective lens 105 and the optical member 115. In one example, the corrector lens 310 can be a plano-convex aspheric lens having a predetermined a fourth-order radial surface profile (as described in connection with FIGS. 4 and 6, for example). In another example, the corrector lens 310 can be a positive (or converging) meniscus lens with two spherical surfaces (as described in connection with FIG. 5, for example). In the example embodiment shown in FIG. 3, the corrector lens 310 can be located or otherwise disposed between the objective lens 105 and the optical member 115, at a distance d1 from the optical member 115 and a distance d2 from the objective lens 105. The distance between the objective lens 105 and the focal point 130 is shown as f in this example optical system 300. The distance d2 may be adjusted to provide varying levels of aberration correction. In one aspect, the level of aberration correction is inversely proportional to the distance d2 with a smaller distance translating to a greater level of correction. Conversely, in another aspect, the level of aberration correction can be directly proportional to the distance d1 with a smaller distance translating to a smaller level of correction. It should be understood and appreciated that, in certain embodiments, the distances d1 and d2 can be complementary, such that an increase in d1 can correspond to a decrease in d2 and vice versa.

Distance f between the objective lens 105 and the focal point 130 may be a fixed distance that depends on the focusing characteristics of the objective lens 105 and a desired level of focus on the image generated at the focal point 130. The objective lens 105, the corrector lens 110, and the optical member 115 may be aligned along a central axis 125 (which under cylindrical or radial symmetry is the optical axis of the optical system).

Figure 4:
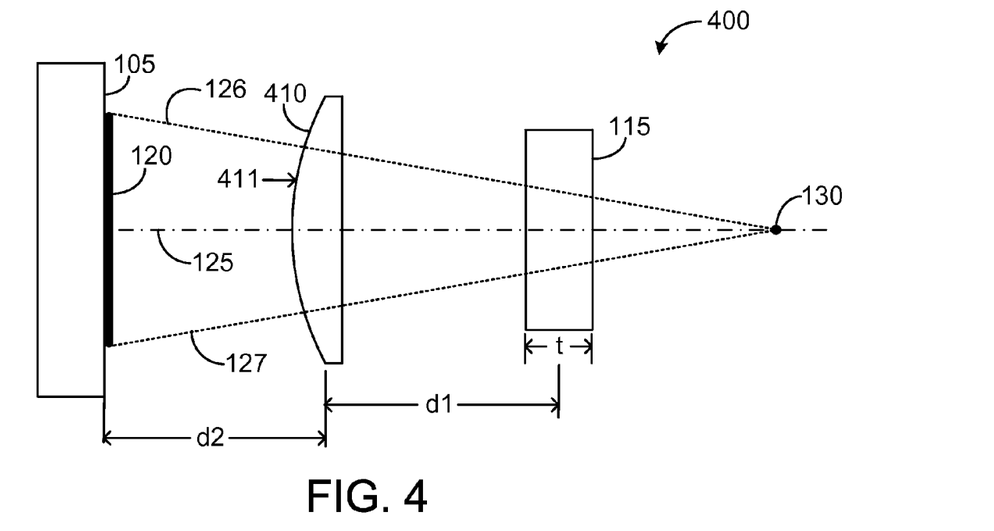

FIG. 4 presents another example embodiment of an optical system 400 in accordance with one or more aspects of the disclosure. The optical system 400 includes the objective lens 105 (although a different objective lens may be provided) and a corrector lens 410 located or otherwise disposed between the objective lens 105 and the optical member 115, which yields the aberration in an image formed at the focal point 130. In the illustrated embodiment, the corrector lens 410 can be embodied in or can contain an aspheric lens, which can be a plano-convex aspheric lens. The various parameters associated with the corrector lens 410 (e.g., a aspheric lens) may include a shape, one or more physical dimensions, a material, and a location for placement of the corrector lens 410 at certain distances with reference to one or both of the objective lens 105 and the optical member 115. Such a shape may include one or more non-planar major surfaces. In the example embodiment shown in FIG. 4, the corrector lens 410 (e.g., a aspheric lens) can include one major surface that is a planar surface and an opposing convex surface 411 having a fourth order aspheric characteristic. In some implementations, depending at least on the wavelength, for example, the aspheric lens that embodies or constitutes the corrector lens 410 may be a silicon dioxide ($SiO_2$) lens located or otherwise disposed along central axis 125, at a distance d1 from the optical member 115 and a distance d2 from the objective lens 105.

In certain example implementations, the corrector lens 410 (e.g., an aspheric lens) may be selected based at least on a thickness along the central axis 125, and a magnitude of fourth-order coefficient of surface deviation. The specific magnitude of fourth-order coefficient of surface deviation can be determined based at least on a desired level of fourth-order correction (or perturbation) to be imposed upon the convergent beam of light propagating through the corrector lens 410 (e.g., an aspheric lens). As described herein, the imposed fourth-order correction (or perturbation) may be directed at providing a radially-symmetric wavefront correction which varies as the fourth power of the radial distance from the central axis 125, thereby corrector at least a part of an aberration introduced by the optical member 115 on the image formed at the focal point 130. It will be understood that the various embodiments described herein may be directed not only at the fourth order coefficient of refraction and correction thereof, but may be used for other orders as well, and more particularly for orders higher than four.

Figure 5:
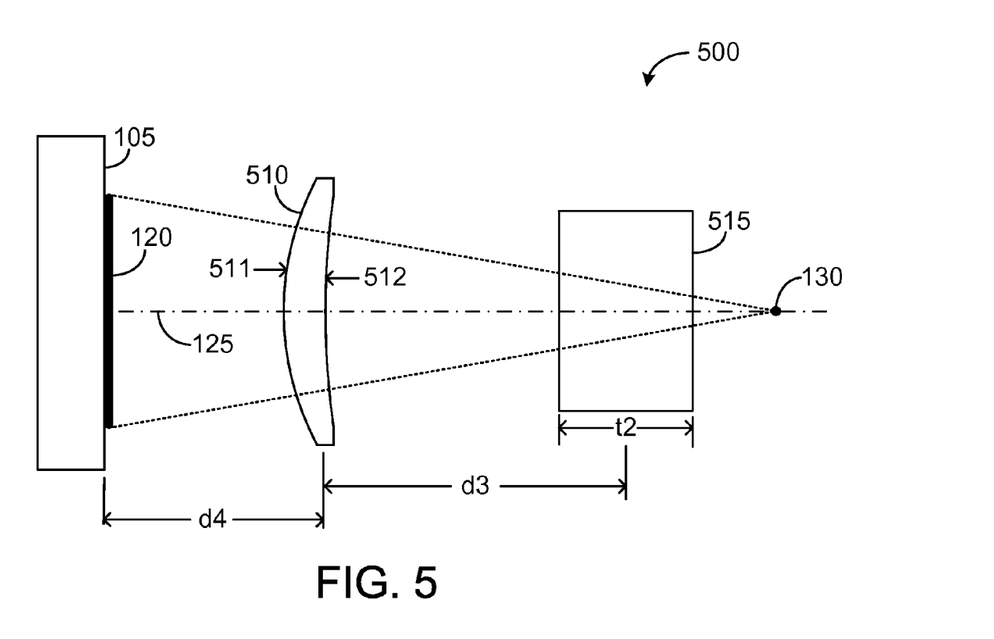

FIG. 5 presents another example embodiment of an optical system 500 in accordance with one or more aspects of the disclosure. System 500 includes an objective lens 105 (that may be the same as the one shown in FIG. 3, for example) and a corrector lens 510 located or otherwise disposed between the objective lens 105 and the optical member 115 that yields the aberration in an image formed at the focal point 130. In the illustrated embodiment, the corrector lens 510 can be embodied in or can include a positive meniscus lens. The positive meniscus lens may provide certain advantages over an aspheric lens, such as partial correction of axial chromatic aberrations, and lower manufacturing cost. It should be appreciated that, in one aspect, an aspheric lens and a positive meniscus lens can operate differently in that the aspheric lens has the 4th order profile figured directly onto a (single) aspheric surface (e.g., convex surface 411), while the positive meniscus produces an effective 4th order compensating aberration because of certain differences in the way light rays refract at the two spherical major surfaces, e.g., surfaces 511 and 512, during propagation through the lens.

The various parameters associated with the corrector lens 510 (e.g., a positive meniscus lens) may include a shape, one or more physical dimensions, a material, and a location for placement of the corrector lens 510 (e.g., the positive meniscus lens) at certain distances with reference to one or both of the objective lens 105 and the optical member 115. In some implementations, depending at least on the wavelength, for example, a positive meniscus lens that embodies or constitutes the corrector lens 510 may be a silicon dioxide ($SiO_2$) lens located or otherwise disposed along central axis 125, at a distance d3 from the optical member 115 and a distance d4 from the objective lens 105.

A positive meniscus lens that embodies or constitutes the corrector lens 510 may be selected based at least on a specific thickness along the central axis 125, and a specific magnitude of fourth-order coefficient of refraction. The specific magnitude of fourth-order coefficient of refraction is typically determined based at least on a desired level of fourth-order correction (or perturbation) to be imposed upon the convergent beam of light propagating through the positive meniscus lens. The imposed fourth-order correction can be directed at a radially symmetric wavefront correction, which can vary as the fourth power of the radial distance from the central axis 125.

In the illustrated example embodiment for the example optical system 500, in one aspect, thickness t2 of the optical member 515 can be different from the thickness t of the optical member 115. The distinction conveys that the optical member 515 may have various thicknesses in various implementations. Typically, these various thicknesses are either predetermined or otherwise known, and this information can be utilized, individually or in conjunction with other information such as, for example, a separation distance between the optical member 515 and the objective lens 105, to determine the shape and/or the placement of the positive meniscus lens 510 between the optical member 515 and the objective lens 105. In certain embodiments, the thickness of the optical member 515 may range from about 1 mm to about 25 mm.

The shape of the corrector lens 510 (e.g., a positive meniscus lens) may be defined, at least in part, by a curvature of the two spherical major surfaces 511 and 512, and a thickness of the corrector lens 510 (e.g., the positive meniscus lens) along the central axis 125. In one example implementation, at least a portion of the spherical major surface 511 can be characterized by a first radius of curvature, and a portion of the opposing major spherical surface 512 can be characterized by a second radius of curvature that may be different than the first radius of curvature.

Figure 6:
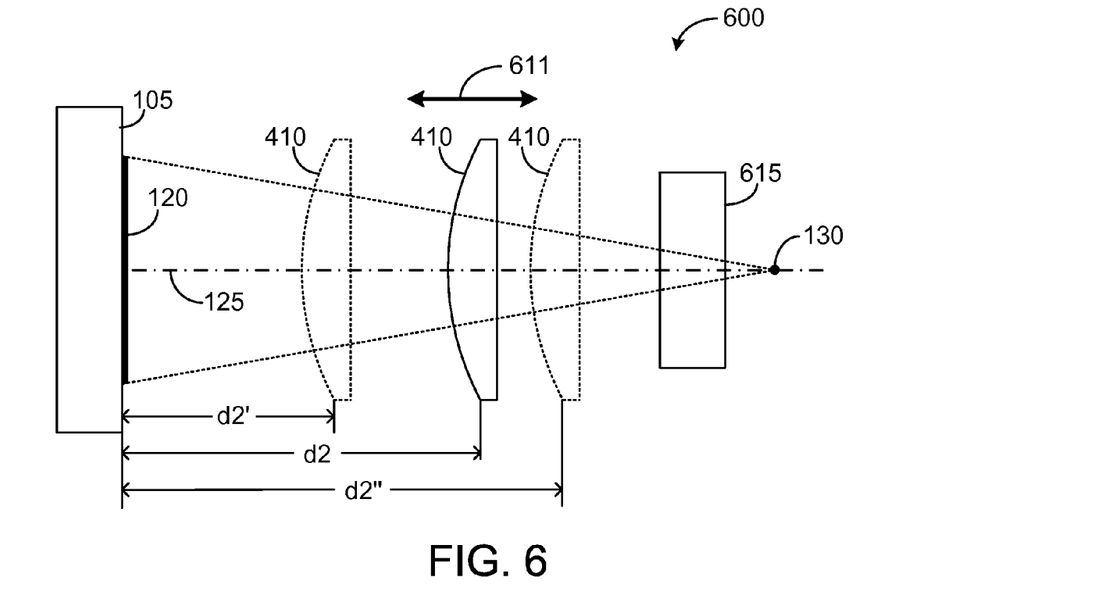

FIG. 6 presents another example embodiment of an optical system 600 in accordance with one or more aspects of the disclosure. The optical system 600 includes the objective lens 105 and a corrector lens that is located or otherwise disposed between the objective lens 105 and the optical member 115. For the sake of description simplicity, the corrector lens shown in FIG. 4 is the aspheric lens 410. However, it should be appreciated that in various embodiments, a variety of other corrector lenses (such as the meniscus lens 510) may be used in addition or as an alternative to the aspheric lens 410. In the illustrated embodiment, the aspheric lens 410 can be movably positioned—which is represented indicated in FIG. 6 by the bi-directional arrow 611—between the objective lens 105 and the optical member 115. In certain implementations, the aspheric lens 410 may be initially located or otherwise disposed at a distance d2 from the objective lens 105. For example, during manufacture a specific distance d2 may be selected. The aspheric lens 410 can be displaced from the position d2 to a position that is closer to the objective lens 105 (e.g., separation distance d2') when a higher aberration correction is desired or needed, or farther from the objective lens 105 (e.g., separation distance d2") when a relatively lower aberration correction is desired or needed. In one aspect, as the aspheric lens 410 (or any other correcting lens) is moved towards the objective 105, the height of the edge ray 126 increases and the amount of maximum aberration correction also increases. In another aspect, as the aspheric lens 410 (or any other correcting lens) moves away from the objective 105, the height of the edge ray 126 decreases and the amount of maximum aberration correction decreases. Such an increase and decrease of the magnitude of the aberration correction while still maintaining the monotonic 4th order dependence on radial position can be suitable to correct for the aberration introduced by the optical member 615 having greater or lesser thicknesses. As such, aberration introduced by a range of thicknesses of the optical member 615 may be corrected with a single aspheric lens 410 (or any other corrector lens) by adjusting or otherwise determining a suitable location of the aspheric lens 410 (or any other corrector lens) within the space between the objective 105 and the optical member 615. As described herein, it should be appreciated that such a principle operates for light propagating either in (1) the objective-member direction—or from left to right from the objective through the window to the focus point 130 beyond the window—, as it would be necessary for laser machining, for example, or (2) the member-objective direction—or from right to left, as from an object point inside the optical member 615 being inspected by a microscope objective outside the optical member 615, for example.

In an alternative or additional example embodiment, two or more corrector lenses may be used in place of a single corrector lens. The two or more corrector lenses may be substantially identical to each other, or may be dissimilar lenses. For example, in a scenario in which the two corrector lenses are dissimilar, the first corrector lens may be an aspheric lens and the second corrector lens may be a positive meniscus lens. The first corrector lens may be located at the distance d2', for example, and the second corrector lens may be located or otherwise disposed at the distance d2", for example).

Various criteria may be used for selecting and/or positioning the two lenses. For example, the first lens may be selected based at least on a desired first level of aberration correction obtainable when placed at a first location along the central axis 125, while the second lens may be selected based at least on a different level of aberration correction obtainable when placed at a second location along the central axis 125. The desired levels of aberration correction may also be determined based at least in part on the perturbation levels provided by each lens (such as a fourth-order perturbation, for example, though higher orders may be used in various embodiments).

Figure 7A:
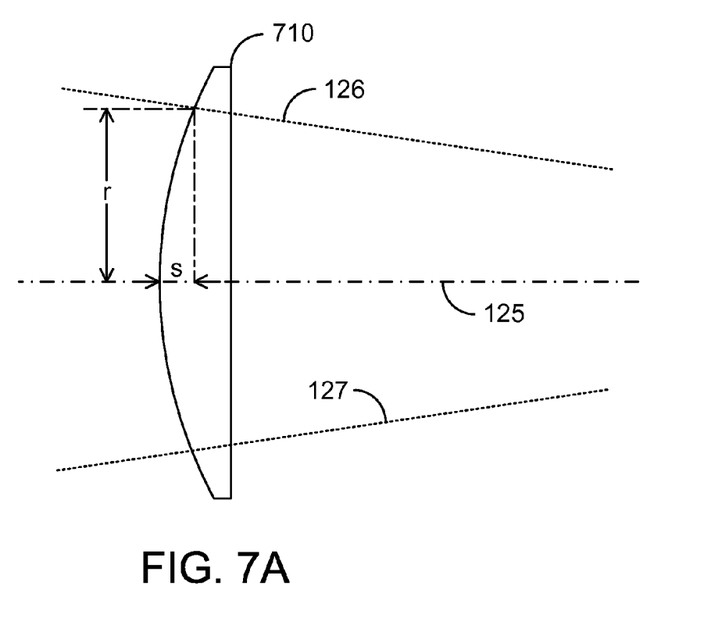
FIG. 7A presents example structural characteristics of an example corrector lens in accordance with one or more aspects of the disclosure.

FIG. 7A illustrates an example of an aspheric lens 710 in accordance with one or more aspects of the disclosure. The aspheric lens 710 can embody or can constitute the corrector lens 410—see, e.g., optical system 400 in which the corrector lens 310 is embodied in the aspheric corrector lens 410. As illustrated, the aspheric lens 710 has a convex surface having a sagitta s, which in certain embodiments, can range from about 0.001 mm to about 0.100 mm. The convergent beam of light (represented by dashed lines 126 and 127) can propagate through the aspherical lens 710 in a wavefront characterized by a radial value r at the edge of the convex surface. It should be appreciated that the radial value r is specific to the relative position between the aspherical lens 710 and an objective lens (e.g., objective lens 105) having certain focal length (e.g., distance f in FIG. 1).

Figure 7B:
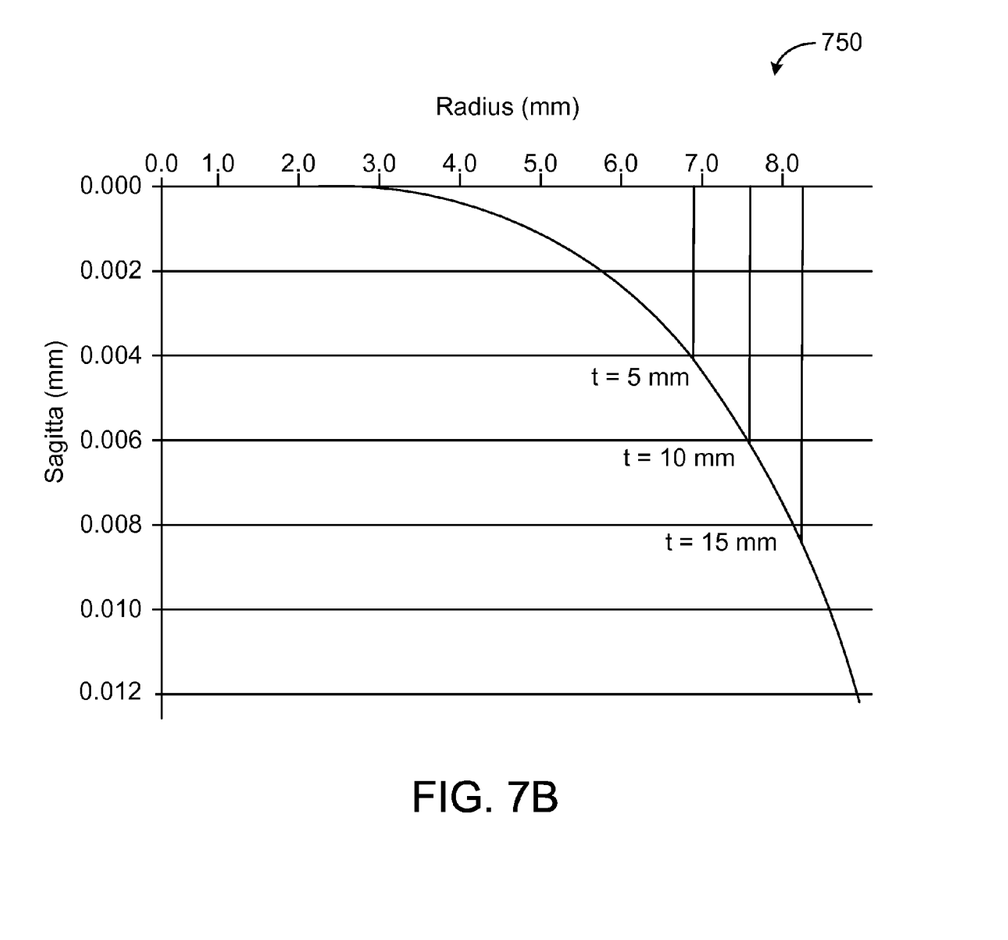
FIG. 7B presents an example graph that illustrates relationships between certain parameters of a corrector lens and aberration-yielding optical members of various thicknesses in accordance with one or more aspects of the disclosure.

FIG. 7B illustrates examples of relationships between certain parameters of the illustrative aspherical lens 710 and aberration-yielding optical members (e.g., optical member 115) of various thicknesses t. In the illustrated chart 750, radial values are presented in the abscissa and values of the sagitta s are presented in the ordinate. The radial values and the sagitta can be related by the thicknesses of the aberration-yielding optical members. The graph may be used for example as follows: Accordingly, in one aspect, for an optical member having a specific thickness t and for an aspheric lens having a specific sagittal s, a radial value r can be determined. As described herein, the radial value represents or otherwise indicates the radius of a light wavefront at the edge of the concave surface having the sagitta s. Accordingly, for t and s, the example chart 750 permits determining a location for the aspherical lens 710 along a central axis (e.g., axis 125) of an optical system including an objective, the optical member having thickness t, and the aspherical lens 710 having sagitta s. More specifically, the location at which the aspherical lens 710 is to be placed corresponds to the location at which the marginal rays 126 and 127 of the propagating light wavefront define a radius r. As an illustration, for an optical system in which t=10 mm and the sagitta of the aspheric lens 710 is s can be approximately 0.006 mm, the value of r is approximately 7.6 mm.

Figure 8:
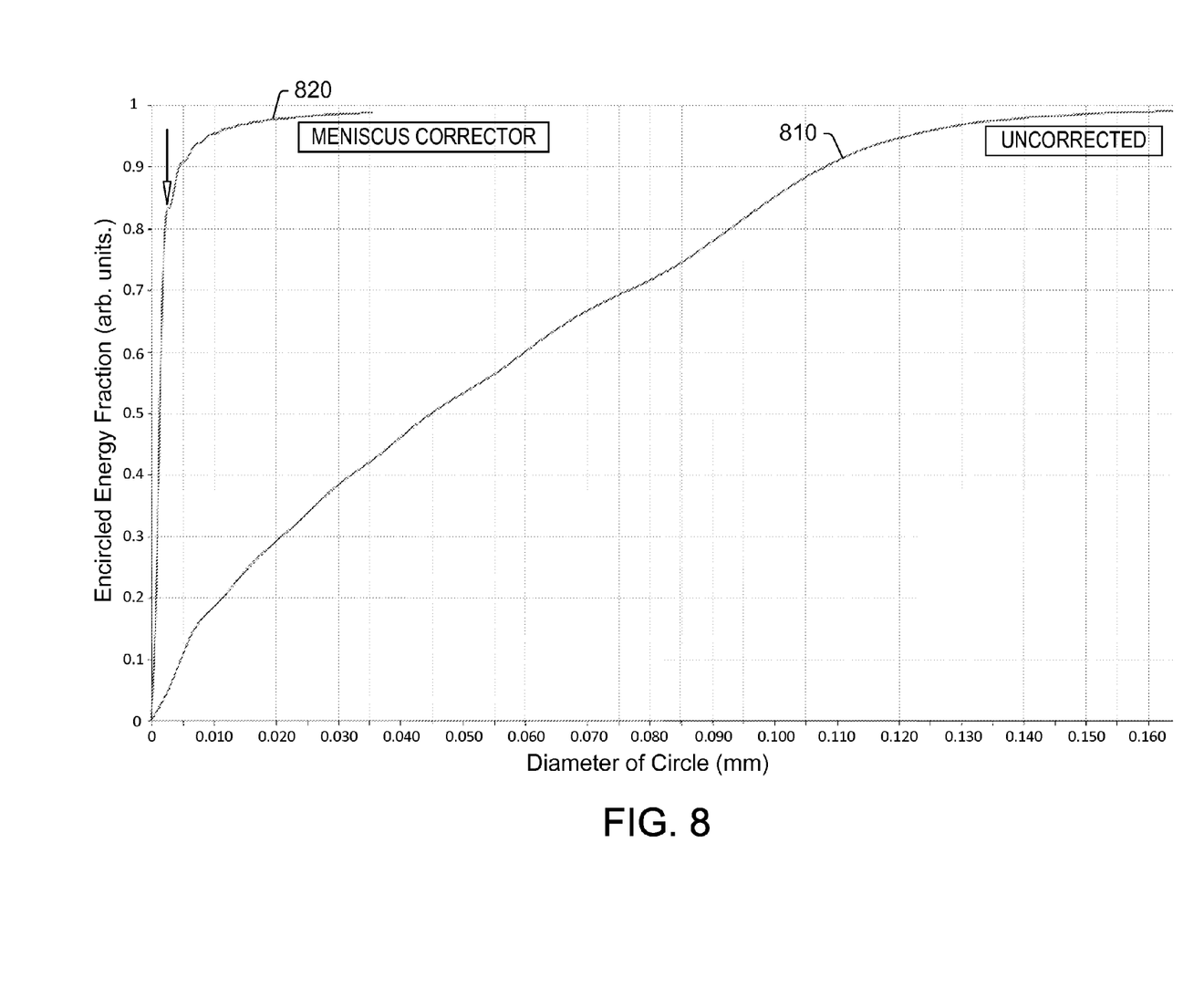
FIG. 8 presents examples of quality metrics of an image formed with and without introduction of a corrector lens in accordance with one or more aspects of the disclosure.

FIG. 8 presents examples of quality metrics for images formed or otherwise obtained with and without introduction of the corrector lens 510 in accordance with one or more aspects of the disclosure. Such images correspond to a focused point through an optical member (e.g., optical member 515). In the illustrated example, the corrector lens 510 is embodied in or can include a meniscus lens, and the optical member 515 can be embodied in or can include a slab of glass (such as N-BK7) having a thickness t2 of about 19 mm. The example quality metrics can be determined or otherwise predicted and can include the percentage of total image energy contained within an area (e.g., a circle) having a specific characteristic size (e.g., a diameter) centered on or substantially on the focus point 130 of the corrector lens 510. The trace 810 represents the quality metric of an image formed via an optical assembly (e.g., optical system 500) of this disclosure without inclusion of the corrector lens 510. In one example, for light traversing the optical member 515 and having a wavelength of 700 nm, the trace 810 can represent the structure of the image 140 depicted in FIG. 1B. In addition, the trace 820 represents the quality metric associated with the structure of the image formed via an optical assembly (e.g., optical system 500) in accordance with this disclosure, including the corrector lens 510 (e.g., a meniscus corrector lens) between the objective lens 105 and the optical member 515. In such an optical assembly, the spacings d3 and d4 (refer to FIG. 5) can be suitably adjusted for the thickness t2 of the optical member 515. For instance, such an adjustment may be based on the analysis described herein in connection with FIG. 2. As illustrated, it can be appreciated that for any given percentage of image energy, the corrected image represented by the trace 820 is considerably smaller in diameter—e.g., a larger amount of energy associated with the corrected image can be encompassed for a smaller diameter with respect to energy associated with the uncorrected image for the same diameters. Therefore, in one aspect, the corrected image formed or otherwise obtained via an optical assembly that includes the corrector lens 510 is improved over an uncorrected image. In addition, it should be appreciated that, in one aspect, the corrected image associated with the trace 820 satisfied the criterion for being diffraction limited (e.g., limited only by the wave nature of light rather than by any geometric aberration). More particularly, without intending to be bound by theory and/or modeling, such a criterion can be that 83% of the image energy be contained within a circle having a diameter equal to the Airy diameter $d_{Airy}=2.44 \cdot \lambda \cdot (f/\#)$, where $\lambda$ is the wavelength of light traversing the corrector lens 510 and the optical member 515, and f/# is the f-number (or focal ratio) defined by the ratio between the focal distance f (refer to FIG. 1, for example) of the objective lens 105 and the diameter of the aperture 120. In a scenario in which $\lambda$=700 nm and f/#=1.92, $d_{Airy}$=3.28 µm, which is identified with an arrow in FIG. 8. I can be readily appreciated from FIG. 8 that the uncorrected image spans an area having a characteristic size of about 160 µm in diameter—which is consistent with the image size shown in FIG. 1B—and the corrected image spans a much smaller area having a characteristic size of less than about 5 µm, which is consistent with being contained within the Airy diameter, and hence being diffraction limited.

It should be appreciated that the description provided herein, which is based on geometrical optics, may be alternatively understood using wave theory for light propagation. In accordance with wave theory, light may be propagated in the form of a set of wavefronts. In an idealized setup, these wavefronts conform to a predictable shape with each successive wavefront replicating a previous wavefront. However, when an aberration-yielding element, such as the optical member 115, is inserted into the light propagation path, the shapes of these wavefronts may be distorted. The distortion may be caused due to a variety of factors, for example, non-uniformity in the refractive index of the material at various regions of the optical member 115.

When these distortions are predictable and quantifiable, corrections can be carried out to remediate the adverse effects of such distortions. In other words, it may be generally understood (in an alternative manner to the geometrical optics description provided above, for example), that the use of the corrector lens 310 in accordance with one or more aspects of the disclosure can permit, at least in part, overcoming adverse effects of wavefront distortion. More specifically, yet not exclusively, the corrector lens 310 in accordance with aspects of the disclosure introduces a fourth order correction (or perturbation) that compensates a monotonic, fourth order aberration introduced by the optical member 115. As described herein, the strength of the fourth order correction can increase with the radial position on the corrector lens, which in turn increases with proximity to the lens objective 105 (also referred to as imaging objective 105); and the strength of such aberration can increase with the diameter of the propagating beam of light and the thickness of the optical member 115. By adjusting the effective compensating strength of the corrector lens 310 through movement of the corrector lens 310 with respect to the lens objective 105 on an optical axis of the optical system, the corrector lens 310 can correct the aberration introduced by windows of different thicknesses without structural changes to the corrector lens. The optical systems disclosed herein permit aberration correction in optical scenarios in which light is focused down to a spot or an image of the spot is being formed (such as in a microscope).

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An optical assembly, comprising:
   an objective lens that produces a convergent beam of light;
   an optical member having a thickness, wherein the optical member is disposed at a distance from the objective lens and propagates at least a portion of the convergent beam of light and whereby propagation of at least the portion of the convergent beam of light yields aberration of an image formed from at least the propagated portion of the convergent beam of light; and
   a corrector lens movably positioned between the objective lens and the optical member at a defined location based at least in part on the thickness, the corrector lens having a substantially uniform index of refraction and introducing a radially symmetric wavefront correction that varies as a fourth power of a radial distance from the central axis of propagation of the convergent beam of light, whereby the corrector lens corrects at least part of the aberration.

2. The assembly of claim 1, wherein the corrector lens provides a correction strength that increases with decreasing a distance between the corrector lens and the objective lens.

3. The assembly of claim 1, wherein the corrector lens provides a correction strength that decreases with decreasing distance between the corrector lens and the optical member.

4. The assembly of claim 1, wherein the corrector lens is an aspheric lens having a defined thickness along a central axis of the aspheric lens, a substantially uniform refractive index, and a fourth-order variation in surface profile.

5. The assembly of claim 1, wherein the corrector lens is a positive meniscus lens having a defined thickness along a central axis of the positive meniscus lens and a substantially uniform refractive index, producing a specific magnitude of fourth-order aberration correction.

6. The optical assembly of claim 5, wherein the positive meniscus lens comprises a first spherical major surface having a first radius of curvature and further comprises a second spherical major surface having a second radius of curvature, the first radius of curvature being less than the second radius of curvature, the first spherical major surface facing the objective lens and the second spherical major surface facing the optical member.

7. The assembly of claim 1, wherein the thickness is in a range from about 0.5 mm to about 25 mm, and the corrector lens is an aspheric corrector lens having at least one curved major surface having a maximum sagitta in a range from about 0.001 mm to about 0.020 mm, the maximum sagittal value increasing in proportion to the thickness.

8. The optical assembly of claim 1, wherein the corrector lens is configured to be moved along a central axis of propagation of the convergent beam of light.

9. The optical assembly of claim 1, wherein the radially symmetric wavefront correction increases monotonically from a first magnitude at the central axis of propagation of the convergent beam of light to a second magnitude greater than zero at an edge of the corrector lens.

10. An optical assembly, comprising:
    an objective lens that converges a beam of light;
    an optical member having a thickness, the optical member being disposed at a distance from the objective lens and propagates at least a portion of the convergent beam of light, whereby propagation of at least the portion of the convergent beam of light yields aberration of an image formed from at least the propagated portion of the convergent beam of light; and
    a first corrector lens movably positioned between the objective lens and the optical member at a defined location based at least in part on the thickness, wherein the first corrector lens has a substantially uniform index of refraction and introduces a first radially symmetric wavefront correction that varies as a fourth power of a radial distance from a central axis of propagation of the convergent beam of light prior to propagation of the at least the portion of the convergent beam of light through the optical member.

11. The assembly of claim 10, further comprising:
    a second corrector lens movably positioned between the first corrector lens and the optical member, wherein the second corrector lens introduces a second radially symmetric wavefront correction which varies as the fourth power of a radial distance from the central axis of propagation of the converging beam of light prior to propagation of the at least the portion of the convergent beam of light through the optical member.

12. The assembly of claim 11, wherein the first radially symmetric wavefront correction is larger than the second radially symmetric wavefront correction.

13. The assembly of claim 11, wherein each of the first corrector lens and the second corrector lens is selected based at least in part on the thickness and a separation distance between the objective lens and the optical member.

14. The assembly of claim 11, wherein each of the first corrector lens and the second corrector lens is configured for adjustable positioning with respect to at least one of the objective lens or the optical member.

15. The assembly of claim 11, wherein at least one of the first corrector lens or the second corrector lens is an aspheric lens having a defined thickness along a central axis and a specific magnitude of a fourth order coefficient of refraction.

16. The assembly of claim 11, wherein at least one of the first corrector lens or the second corrector lens is a positive meniscus lens having a defined thickness along a central axis of the positive meniscus lens and a specific magnitude of a fourth order coefficient of refraction.

17. A method comprising:
    providing an objective lens that produces a convergent beam of light;
    providing an optical member having a thickness and positioned at a distance from the objective lens, the optical member propagates at least a portion of the convergent beam of light, whereby propagation of at least the portion of the convergent beam of light yields aberration of an image formed from at least the propagated portion of the convergent beam of light; and
    providing a corrector lens movably positioned between the objective lens and the optical member at a defined location based at least in part on the thickness, the corrector lens having a substantially uniform index of refraction and introducing a first radially symmetric wavefront correction which varies as a fourth power of a radial distance from a central axis of propagation of the convergent beam of light, whereby the corrector lens corrects at least part of the aberration.

18. The method of claim 17, wherein the corrector lens provides a predetermined reduction in aberration based at least in part on a separation between the corrector lens and the optical member.

19. The method of claim 18, wherein the predetermined reduction in aberration comprises a predetermined reduction in lateral geometric error in the image.

20. The method of claim 18, wherein the predetermined reduction in aberration comprises a predetermined reduction in lateral geometric error in the image, and wherein the lateral geometric error is substantially the same in diameter as a diffraction Airy diameter defined by a wavelength of the convergent beam of light and a numerical aperture of the objective lens.

* * * * *